United States Patent
Gou et al.

(10) Patent No.: US 10,616,923 B2
(45) Date of Patent: Apr. 7, 2020

(54) METHOD AND APPARATUS FOR PERFORMING LISTEN-BEFORE-TALK ON MULTIPLE UNLICENSED CARRIERS

(71) Applicant: ZTE CORPORATION, Guangdong (CN)

(72) Inventors: Wei Gou, Guangdong (CN); Feng Bi, Guangdong (CN); Yajun Zhao, Guangdong (CN); Bo Dai, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 109 days.

(21) Appl. No.: 15/751,118

(22) PCT Filed: Aug. 1, 2016

(86) PCT No.: PCT/CN2016/092726
§ 371 (c)(1),
(2) Date: Feb. 7, 2018

(87) PCT Pub. No.: WO2017/024961
PCT Pub. Date: Feb. 16, 2017

(65) Prior Publication Data
US 2018/0235007 A1    Aug. 16, 2018

(30) Foreign Application Priority Data
Aug. 7, 2015  (CN) .......................... 2015 1 0483679

(51) Int. Cl.
*H04W 74/08* (2009.01)
*H04L 27/00* (2006.01)
(Continued)

(52) U.S. Cl.
CPC ..... *H04W 74/0808* (2013.01); *H04L 27/0006* (2013.01); *H04W 16/14* (2013.01); *H04L 5/001* (2013.01); *H04L 5/0033* (2013.01)

(58) Field of Classification Search
None
See application file for complete search history.

(56) References Cited

U.S. PATENT DOCUMENTS

2015/0092758 A1   4/2015  Chen et al.
2015/0373741 A1*  12/2015 Yerramalli ........ H04W 74/0808
                                                                370/336
(Continued)

FOREIGN PATENT DOCUMENTS

CN    104333873 A    2/2015
CN    104540158 A    4/2015
(Continued)

OTHER PUBLICATIONS

International Search Report dated Oct. 27, 2016 for International Application No. PCT/CN2016/092726, 5 pages.
(Continued)

*Primary Examiner* — Lonnie V Sweet
(74) *Attorney, Agent, or Firm* — Knobbe, Martens, Olson & Bear LLP

(57) ABSTRACT

A method for performing listen-before-talk (LBT) on multiple unlicensed carrier includes: performing, by a station, an individual LBT mechanism on each of unlicensed carriers to be aggregated to obtain a right to use the each of the unlicensed carriers; or configuring, by the station, a same LBT mechanism for the unlicensed carriers to be aggregated, performing a unified LBT mechanism on each of the unlicensed carriers to be aggregated to obtain the right to use each of the unlicensed carriers; or grouping, by the station, the unlicensed carriers to be aggregated, performing a corresponding LBT mechanism on each group of unlicensed
(Continued)

---

When a station aggregates unlicensed carriers, the station performs an CCA detection with a given duration on each of the unlicensed carriers When a result of the CCA detection on the each of the unlicensed carriers indicates that a channel is idle, the station generates a random back-off value N for the each of the unlicensed carriers Perform an eCCA detection and decrement the value N to obtain a right to use each of the unlicensed carriers carriers to obtain a right to use the each group of unlicensed carriers.

10 Claims, 3 Drawing Sheets

(51) Int. Cl.
  *H04W 16/14* (2009.01)
  *H04L 5/00* (2006.01)

(56) References Cited

U.S. PATENT DOCUMENTS

| | | | |
|---|---|---|---|
| 2016/0278088 A1* | 9/2016 | Cheng | H04L 47/27 |
| 2016/0338019 A1 | 11/2016 | Ratasuk et al. | |
| 2017/0171759 A1 | 6/2017 | Li et al. | |
| 2017/0303288 A1 | 10/2017 | Li et al. | |
| 2018/0054741 A1* | 2/2018 | Froberg Olsson | H04W 16/14 |
| 2018/0175975 A1* | 6/2018 | Um | H04L 1/1816 |

FOREIGN PATENT DOCUMENTS

| | | |
|---|---|---|
| CN | 104717686 A | 6/2015 |
| EP | 3226445 A1 | 10/2017 |
| WO | 2015/116159 A1 | 8/2015 |

OTHER PUBLICATIONS

Written Opinion of the International Searching Authority dated Oct. 27, for International Application No. PCT/CN2016/092726, 3 pages.
Partial Supplementary European Search Report of corresponding Application No. 16834585.8—16 pages (dated Jul. 1, 2019).

* cited by examiner

```
┌─────────────────────────────────────────────────────────────┐
│   A station performs an individual LBT mechanism on each of │
│ unlicensed carriers to be aggregated to obtain a right to use the each │
│                  of the unlicensed carriers                 │
└─────────────────────────────────────────────────────────────┘
                              │
                              │
┌─────────────────────────────────────────────────────────────┐
│ Or, the station configures a same LBT mechanism for the unlicensed │
│ carriers to be aggregated, and performs a unified LBT mechanism on │
│ each of the unlicensed carriers to be aggregated to obtain the right to │
│            use each of the unlicensed carriers              │
└─────────────────────────────────────────────────────────────┘
                              │
                              │
┌─────────────────────────────────────────────────────────────┐
│  Or, the station groups the unlicensed carriers to be aggregated, and │
│       performs a corresponding LBT mechanism on each group of │
│          unlicensed carriers to obtain a right to use each group of │
│                     unlicensed carriers                     │
└─────────────────────────────────────────────────────────────┘
                              │
                              │
┌─────────────────────────────────────────────────────────────┐
│ Or, the station selects a plurality of unlicensed carriers for performing │
│    the LBT mechanism, the number of plurality of unlicensed carriers │
│ being greater than a planned number of unlicensed carriers ; and after │
│      unlicensed carriers of the planned number among the plurality of │
│         unlicensed carriers are obtained in performing of the LBT │
│   mechanism, the station stops performing the LBT mechanism on the │
│                    remaining unlicensed carriers .          │
└─────────────────────────────────────────────────────────────┘
```

FIG. 1

METHOD AND APPARATUS FOR PERFORMING LISTEN-BEFORE-TALK ON MULTIPLE UNLICENSED CARRIERS

CROSS REFERENCE TO RELATED APPLICATIONS

This application is the U.S. National Phase Application under 35 U.S.C. § 371 of International Application No. PCT/CN2016/092726 filed on Aug. 1, 2016, designating the U.S. and published as WO 2017/024961 A1 on Feb. 16, 2017, and claims the benefit of Chinese Patent Application No. 201510483679.9, filed on Aug. 7, 2015, which are hereby incorporated by reference in their entirety.

TECHNICAL FIELD

The present application relates to, but not limited to, the field of mobile wireless communications, and particularly, to a method and an apparatus for performing listen before talk (LBT) on multiple unlicensed carriers.

BACKGROUND

At present, LTE (Long Term Evolution) is deployed in a licensed carrier for operation. However, with the rapid growth of data services, a licensed spectrum will not be able to withstand such a huge amount of data in the near future. Therefore, the LTE needs to be deployed in an unlicensed spectrum to share data traffic in the licensed carrier through the unlicensed spectrum.

In addition, the unlicensed spectrum also has many advantages. For example, the unlicensed spectrum has the following characteristics and advantages:

free/low cost (there is no need for buying the unlicensed spectrum, so that a spectrum resource is costless);

low admission requirements and low cost (individuals and enterprises may participate in the deployment, equipment of equipment manufacturers may be arbitrary);

resource sharing (when resources are shared among multiple different systems or among different operators of the same system, some ways to share the resources may be considered and the spectral efficiency is improved).

multiple wireless access technologies (across different communication standards, collaboration difficulty, network topology diversity);

multiple wireless access stations (a large number of users, great collaboration difficulty, high centralized management overhead); and multiple applications (multiple services which are mentioned may be operated therein, for example, Machine to machine (M2M), Vehicle to vehicle (V2V)).

The above basic characteristics determine that the unlicensed spectrum may be an important evolution direction of a wireless communication system, but has many problems. For example, there will be a wide variety of wireless systems in the unlicensed spectrum, which are difficult to collaborate with each other and seriously interfered by each other.

Multicarrier aggregation is one of key technologies of the LTE. By aggregating multiple carriers, a bandwidth actually used becomes larger, so that a larger peak rate is provided. When the LTE is deployed in the unlicensed carrier and there is a need for supporting aggregation of multiple unlicensed carriers, how to implement an LBT mechanism for enabling the stations to quickly and simultaneously acquire the right to use a plurality of unlicensed carriers to be aggregated, is a problem to be solved.

SUMMARY

The following is a summary of the subject matter described in detail in this specification. This summary is not intended to limit a protective scope of the claims.

Embodiments of the present disclosure provide a method and an apparatus for performing LBT on multiple unlicensed carriers, through which the aggregation of unlicensed carriers is achieved.

According to a first aspect, an embodiment of the present disclosure provides a method for performing LBT on multiple unlicensed carriers, including:

performing, by a station, an individual LBT mechanism on each of unlicensed carriers to be aggregated to obtain a right to use the each of the unlicensed carriers;

or, configuring, by the station, a same LBT mechanism for the unlicensed carriers to be aggregated, performing a unified LBT mechanism on each of the unlicensed carriers to be aggregated to obtain the right to use each of the unlicensed carriers;

or, grouping, by the station, the unlicensed carriers to be aggregated, performing a corresponding LBT mechanism on each group of unlicensed carriers to obtain a right to use the each group of unlicensed carriers;

or, selecting, by the station, a plurality of unlicensed carriers for performing the LBT, the number of plurality of unlicensed carriers being greater than a planned number of unlicensed carriers; and after unlicensed carriers of the planned number among the plurality of unlicensed carriers are obtained in performing of the LBT, stopping performing the LBT mechanism on the remaining unlicensed carriers.

Alternatively, the above method further includes: transmitting data on the unlicensed carriers, whose rights of use are obtained, in a carrier aggregation manner.

Alternatively, the step of performing, by a station, an individual LBT mechanism on each of unlicensed carriers to be aggregated to obtain a right to use the each of the unlicensed carriers includes one of:

when the station performs the LBT mechanism on unlicensed carriers to be preempted and planned to be aggregated, using, by the station, a same random number N in random back-off of the unlicensed carriers to be preempted; when extended Clear Channel Assessment (eCCA) detections of a plurality of unlicensed carriers simultaneously indicate idle, decrementing a value of N; and when the value of N is 0, the plurality of unlicensed carriers are preempted by the station simultaneously;

or, determining, by the station, the unlicensed carriers to be preempted and planned to be aggregated, and performing LBT on the plurality of unlicensed carriers separately, and generating an independent random value N for each of the plurality of unlicensed carriers; when the station successfully contends for one unlicensed carrier of the plurality of unlicensed carriers, the station having a priority in the preemption of an unlicensed carrier at a frequency point within a first preset range around the one unlicensed carrier for which the station successfully contended until the plurality of unlicensed carriers are preempted by the station;

or, when the station already has a right to use an unlicensed carrier and the station aggregates unlicensed carriers at a frequency point within a second preset range around the unlicensed carrier, the station having a priority in the preemption for aggregating the unlicensed carriers at the frequency point within the second preset range, until the plurality of unlicensed carriers are preempted by the station;

or, when the station performs the LBT on the unlicensed carriers to be preempted and planned to be aggregated and an interval from preempting one unlicensed carrier of the unlicensed carriers to be preempted by the station to a moment of successful preemption is less than or equal to a third preset range, initiating, by the station, clear channel assessment (CCA) detections on other unlicensed carriers to be aggregated, when consecutive eCCA detections within the third preset range all indicate idle, the station having the right to use the one unlicensed carrier; proceeding to perform by the station the eCCA detections on the unlicensed carrier which has an interval of being preempted successfully within the third preset range, and when consecutive eCCA detections within the third preset range all indicate idle, the station having the right to use the unlicensed carrier.

Alternatively, the station sets the priority in the preemption by setting a parameter involved in performing the LBT, and increases a duration of a last one of the consecutive eCCA detections within the third preset range.

Alternatively, after proceeding to perform by the station the eCCA detections on the unlicensed carrier which has an interval of being preempted successfully within the third preset range and consecutive eCCA detections within the third preset range all indicate idle, the method further includes:

performing, by the station, the CCA detections on the unlicensed carriers to be preempted and planned to be aggregated; and when the CCA detections indicate idle, obtaining, by the station, the right to use the unlicensed carriers.

Alternatively, the step of grouping, by the station, the unlicensed carriers to be aggregated, performing a corresponding LBT mechanism on each group of unlicensed carriers to obtain a right to use the each group of unlicensed carriers includes:

grouping continuous ones of the unlicensed carriers to be aggregated into a group; or grouping a plurality of unlicensed carriers among the unlicensed carriers to be aggregated into a group, carrier component differences of the plurality of unlicensed carriers being less than a fourth preset range; or grouping a plurality of unlicensed carriers according to an indication signaling;

determining a primary unlicensed carrier PLAAcell for each group of unlicensed carriers; and performing the LBT based on each group of unlicensed carriers according to the determined PLAAcell.

Alternatively, the step of performing the LBT based on each group of unlicensed carriers according to the determined PLAAcell includes one of:

performing the LBT on each unlicensed carrier in each group of unlicensed carriers independently; and when the right to use the PLAAcell of the each group of unlicensed carriers is obtained, reducing a number of eCCA detections for other unlicensed carriers in the each group of unlicensed carriers;

or, performing the LBT on each unlicensed carrier in each group of unlicensed carriers independently; and when the right to use the PLAAcell of the each group of unlicensed carriers is obtained, decrementing a contention back-off window for other unlicensed carriers in the each group of unlicensed carriers;

or, performing the LBT on each unlicensed carrier in each group of unlicensed carriers independently; and when the right to use the PLAAcell of the each group of unlicensed carriers is obtained, determining and obtaining the right to use other unlicensed carriers in the each group of unlicensed carriers according to a time difference between a duration in which other unlicensed carriers in the each group of unlicensed carriers are detected to be idle at this time and a moment when the right to use the PLAAcell in the each group of unlicensed carriers is obtained;

or, performing the LBT on each unlicensed carrier in each group of unlicensed carriers with the each unlicensed carrier as a carrier, and when a detection indicates that the each unlicensed carrier is idle, obtaining the right to use the each unlicensed carrier of the each group of unlicensed carriers.

Alternatively, the step of determining and obtaining the right to use other unlicensed carriers in the each group of unlicensed carriers according to a time difference between a duration in which other unlicensed carriers in the each group of unlicensed carriers are detected to be idle at this time and a moment when the right to use the PLAAcell in the each group of unlicensed carriers is obtained includes:

when a time difference between a duration in which an unlicensed carrier other than the PLAAcell in the each group of unlicensed carriers is detected to be idle at this time and the moment when the right to use the PLAAcell in the each group of unlicensed carriers is obtained is greater than a preset duration, obtaining the right to use the unlicensed carrier; when the time difference between the duration in which the unlicensed carrier is detected to be idle at this time and the moment when the right to use the PLAAcell in the each group of unlicensed carriers is obtained is less than or equal to the preset duration, abdicating the right to use the unlicensed carrier;

or when a time difference between the moment when the right to use the PLAAcell in the each group of unlicensed carriers is obtained and a sum of the duration in which the unlicensed carrier other than the PLAAcell in the each group of unlicensed carriers is detected to be idle at this time and a duration of signal sending is greater than the preset duration, obtaining the right to use the unlicensed carrier; when the time difference between the moment when the right to use the PLAAcell in the each group of unlicensed carriers is obtained and the sum of the duration in which the unlicensed carrier other than the PLAAcell in the each group of unlicensed carriers is detected to be idle at this time and the duration of signal sending is less than or equal to the preset duration, abdicating the right to use the unlicensed carrier.

Alternatively, the step of determining a primary unlicensed carrier PLAAcell for each group of unlicensed carriers includes:

performing the LBT for each unlicensed carrier in the each group of unlicensed carriers, and determining an unlicensed carrier, whose right of use is firstly obtained, as the PLAAcell of the each group of unlicensed carriers;

or, in the case of performing the LBT for each unlicensed carrier in the each group of unlicensed carriers and simultaneously obtaining the right to use more than one unlicensed carriers, determining the more than one unlicensed carriers as the PLAAcells of the each group of unlicensed carriers, or selecting one of the more than one unlicensed carriers as the PLAAcell of the each group of unlicensed carriers;

or, performing the LBT on each unlicensed carrier in the each group of unlicensed carriers, and determining the PLAAcell of the each group of unlicensed carriers according to a preset setting.

Alternatively, the step of determining the PLAAcell of the each group of unlicensed carriers according to a preset setting includes: taking an unlicensed carrier at a lowest frequency point in the each group of unlicensed carriers as the PLAAcell of the each group of unlicensed carriers.

According to a second aspect, an embodiment of the present disclosure further provides an apparatus for performing LBT on multiple unlicensed carriers, including:

a first resource module configured to perform an individual LBT mechanism on each of unlicensed carriers to be aggregated to obtain a right to use the each of the unlicensed carriers;

or, a second resource module configured to configure a same LBT mechanism for the unlicensed carriers to be aggregated, and perform a unified LBT mechanism on each of the unlicensed carriers to be aggregated to obtain the right to use each of the unlicensed carriers;

or, a third resource module configured to group the unlicensed carriers to be aggregated, and perform a corresponding LBT mechanism on each group of unlicensed carriers to obtain a right to use the each group of unlicensed carriers;

or, a fourth resource module configured to select a plurality of unlicensed carriers for performing the LBT mechanism, the number of plurality of unlicensed carriers being greater than a planned number of unlicensed carriers; and after unlicensed carriers of the planned number among the plurality of unlicensed carriers is obtained in performing of the LBT mechanism, and stop performing the LBT mechanism on the remaining unlicensed carriers.

Alternatively, the apparatus further includes a transmission module, which is configured to: transmit data on the unlicensed carriers, whose rights of use are obtained, in a carrier aggregation manner.

Alternatively, the first resource module includes:

a first preemption unit configured to: when the station performs the LBT mechanism on unlicensed carriers to be preempted and planned to be aggregated, use a same random number N in random back-off of the unlicensed carriers to be preempted; when extended clear channel assessment (eCCA) detections of a plurality of unlicensed carriers simultaneously indicate idle, decrement a value of N; and when the value of N is 0, the plurality of unlicensed carriers are preempted by the station simultaneously;

or, a second preemption unit configured to: determine the unlicensed carriers to be preempted and planned to be aggregated, and performing LBT on the plurality of unlicensed carriers separately, and generate an independent random value N for each of the plurality of unlicensed carriers; when successfully contending for one unlicensed carrier of the plurality of unlicensed carriers, obtain a priority in the preemption of an unlicensed carrier at a frequency point within a first preset range around the one unlicensed carrier for which the station successfully contended until the plurality of unlicensed carriers are preempted;

or, a third preemption unit configured to: when the station already has a right to use an unlicensed carrier and aggregates unlicensed carriers at a frequency point within a second preset range around the unlicensed carrier, obtain a priority in the preemption for aggregating the unlicensed carriers at the frequency point within the second preset range, until the plurality of unlicensed carriers are preempted;

or, a fourth preemption unit configured to: when the station performs the LBT on the unlicensed carriers to be preempted and planned to be aggregated and an interval from preempting one unlicensed carrier of the unlicensed carriers to be preempted by the station to a moment of successful preemption is less than or equal to a third preset range, initiate clear channel assessment (CCA) detections on other unlicensed carriers to be aggregated, when consecutive eCCA detections within the third preset range all indicate idle, obtain the right to use the one unlicensed carrier; proceed to perform by the station the eCCA detections on the unlicensed carrier which has an interval of being preempted successfully within the third preset range, and when consecutive eCCA detections within the third preset range all indicate idle, obtain the right to use the unlicensed carrier.

Alternatively, each of the second preemption unit and the third preemption unit is further configured to set the priority in the preemption by setting a parameter involved in performing the LBT, and increase a duration of a last one of the consecutive eCCA detections within the third preset range.

Alternatively, the fourth preemption unit is further configured to perform the CCA detections on the unlicensed carriers to be preempted and planned to be aggregated; and when the CCA detections indicate idle, obtain the right to use the unlicensed carriers.

Alternatively, the third resource module includes:

a grouping unit configured to group continuous ones of the unlicensed carriers to be aggregated into a group; or group a plurality of unlicensed carriers among the unlicensed carriers to be aggregated into a group, carrier component differences of the plurality of unlicensed carriers being less than a fourth preset range; or group a plurality of unlicensed carriers according to an indication signaling;

a main carrier unit configured to determine a primary unlicensed carrier PLAAcell for each group of unlicensed carriers; and an execution unit configured to perform the LBT based on each group of unlicensed carriers according to the determined PLAAcell.

Alternatively, the performing unit includes one of the following:

a first component subunit configured to perform the LBT on each unlicensed carrier in each group of unlicensed carriers independently; and when the right to use the PLAAcell of the each group of unlicensed carriers is obtained, reduce a number of eCCA detections for other unlicensed carriers in the each group of unlicensed carriers;

or, a second component subunit configured to perform the LBT on each unlicensed carrier in each group of unlicensed carriers independently; and when the right to use the PLAAcell of the each group of unlicensed carriers is obtained, decrement a contention back-off window for other unlicensed carriers in the each group of unlicensed carriers;

or, a third component subunit configured to perform the LBT on each unlicensed carrier in each group of unlicensed carriers independently; and when the right to use the PLAAcell of the each group of unlicensed carriers is obtained, determine and obtain the right to use other unlicensed carriers in the each group of unlicensed carriers according to a time difference between a duration in which other unlicensed carriers in the each group of unlicensed carriers are detected to be idle at this time and a moment when the right to use the PLAAcell in the each group of unlicensed carriers is obtained;

or, a fourth component subunit configured to perform the LBT on each unlicensed carrier in each group of unlicensed carriers with the each unlicensed carrier as a carrier, and when a detection indicates that the each unlicensed carrier is idle, obtain the right to use the each unlicensed carrier of the each group of unlicensed carriers.

Alternatively, the third component subunit is configured to: when a time difference between a duration in which an unlicensed carrier other than the PLAAcell in the each group of unlicensed carriers is detected to be idle at this time and the moment when the right to use the PLAAcell in the each group of unlicensed carriers is obtained is greater than a preset duration, obtain the right to use the unlicensed carrier; when the time difference between the duration in which the unlicensed carrier is detected to be idle at this time and the moment when the right to use the PLAAcell in the each group of unlicensed carriers is obtained is less than or equal to the preset duration, abdicate the right to use the unlicensed carrier;

or, when a time difference between the moment when the right to use the PLAAcell in the each group of unlicensed carriers is obtained and a sum of the duration in which the unlicensed carrier other than the PLAAcell in the each group of unlicensed carriers is detected to be idle at this time and a duration of signal sending is greater than the preset duration, obtain the right to use the unlicensed carrier; when the time difference between the moment when the right to use the PLAAcell in the each group of unlicensed carriers is obtained and the sum of the duration in which the unlicensed carrier other than the PLAAcell in the each group of unlicensed carriers is detected to be idle at this time and the duration of signal sending is less than or equal to the preset duration, abdicate the right to use the unlicensed carrier.

Alternatively, the main carrier unit is configured to: perform the LBT for each unlicensed carrier in the each group of unlicensed carriers, and determine an unlicensed carrier, whose right of use is firstly obtained, as the PLAAcell of the each group of unlicensed carriers; or, in the case of performing the LBT for each unlicensed carrier in the each group of unlicensed carriers and simultaneously obtaining the right to use more than one unlicensed carriers, determine the more than one unlicensed carriers as the PLAAcells of the each group of unlicensed carriers, or select one of the more than one unlicensed carriers as the PLAAcell of the each group of unlicensed carriers; or, perform the LBT on each unlicensed carrier in the each group of unlicensed carriers, and determine the PLAAcell of the each group of unlicensed carriers according to a preset setting.

Alternatively, the main carrier unit is further configured to take an unlicensed carrier at a lowest frequency point in the each group of unlicensed carriers as the PLAAcell of the each group of unlicensed carriers.

According to a third aspect, an embodiment of the present disclosure further provides a method for performing LBT on multiple unlicensed carriers, including: when a station aggregates unlicensed carriers, performing, by the station, a clear channel assessment (CCA) detection with a given duration on each of the unlicensed carriers; when a result of the CCA detection on the each of the unlicensed carriers indicates that a channel is idle, generating, by the station, a random back-off value N for the each of the unlicensed carriers; and performing an extended clear channel assessment (eCCA) detection to decrement the value of N to obtain a right to use each of the unlicensed carriers. The station uses a same random back-off value N in random back-off of all of the unlicensed carriers.

Alternatively, the CCA detection with the given duration is an initial CCA detection;

before the eCCA detection and after the CCA detection with the given duration, the method further includes: performing, by the station, a CCA detection with a duration of a delay period; and performing the eCCA detection when a result of the CCA detection with the duration of the delay period indicates that the channel is idle.

Alternatively, a decrement rule of the N value is as follows: when eCCA detections on the unlicensed carriers indicate idle simultaneously, the N value is decremented.

Alternatively, when performing the CCA with the given duration on each of the unlicensed carriers, the station independently generates a same contention back-off window for each of the unlicensed carriers, or the station negotiates with other stations to generate a same contention back-off window for each of the unlicensed carriers.

Alternatively, when performing the CCA with the given duration on each of the unlicensed carriers, the station independently generates a same random back-off value N for each of the unlicensed carriers, or the station negotiates with other stations to generate a same random back-off value N for each of the unlicensed carriers.

Alternatively, when performing CCA on the unlicensed carriers respectively, the station generates the N value according to a size of a contention back-off window of one of the unlicensed carriers.

Alternatively, the one of the unlicensed carriers the one of the unlicensed carriers has the largest or smallest contention back-off window.

According to a fourth aspect, an embodiment of the present disclosure further provides an apparatus for performing LBT on multiple unlicensed carriers, including: a first detection module configured to, when a station aggregates unlicensed carriers, perform a clear channel assessment (CCA) detection with a given duration on each of the unlicensed carriers; a processing module configured to, when a result of the CCA detection on the each of the unlicensed carriers indicates that a channel is idle, generate a random back-off value N for the each of the unlicensed carriers; and a second detection module configured to perform an extended clear channel assessment (eCCA) detection to decrement the value of N to obtain a right to use each of the unlicensed carriers. The station uses a same random back-off value N in random back-off of all of the unlicensed carriers.

Alternatively, the CCA detection with the given duration is an initial CCA detection;

the apparatus further comprises a third detection module configured to, before the eCCA detection and after the CCA detection with the given duration, perform a CCA detection with a duration of a delay period; and the second detection module is configured to perform the eCCA detection when a result of the CCA detection with the duration of the delay period indicates that the channel is idle.

Alternatively, the first detection module is configured to, when performing the CCA with the given duration on each of the unlicensed carriers, independently generate the same random back-off value N for each of the unlicensed carriers, or negotiate with other stations to generate the same random back-off value N for each of the unlicensed carriers.

Alternatively, the processing module is configured to: the processing module is configured to, when performing CCA on the unlicensed carriers respectively, generate the N value according to a size of a contention back-off window of one of the unlicensed carriers.

Alternatively, the one of the unlicensed carriers is the one has the largest or smallest contention back-off window.

An embodiment of the present disclosure further provides a computer-readable storage medium storing a computer executable instruction which, when being executed, implements the method for performing listen before talk on multiple unlicensed carriers according to the first aspect.

An embodiment of the present disclosure further provides a computer-readable storage medium storing a computer-executable instruction which, when being executed, implements the method for performing listen before talk on multiple unlicensed carriers according to the third aspect.

Compared with the related art, the embodiments of the present disclosure have the following beneficial effects:

According to the method and the apparatus for performing LBT on multiple unlicensed carriers provided by the embodiments of the present disclosure, LBT is performed on unlicensed carriers to be aggregated, and an independent LBT mechanism is performed on each unlicensed carrier; or a uniform LBT mechanism is performed on each unlicensed carrier by configuration; or the unlicensed carriers to be aggregated are grouped, and then an LBT mechanism is performed; or multiple unlicensed carriers the number of which is greater than that of the unlicensed carriers planned to be used are selected for performing the LBT mechanism. It is possible to implement that use rights of a plurality of unlicensed carriers are rapidly and simultaneously acquired when the plurality of unlicensed carriers are required to be aggregated, so that aggregating the unlicensed carriers is facilitated.

Other aspects will become apparent upon reading and understanding the drawings and the detailed description.

BRIEF DESCRIPTION OF DRAWINGS

FIG. 1 is a flowchart of a method for performing LBT on multiple unlicensed carriers according to an embodiment of the present invention;

DETAILED DESCRIPTION

Figure 2:
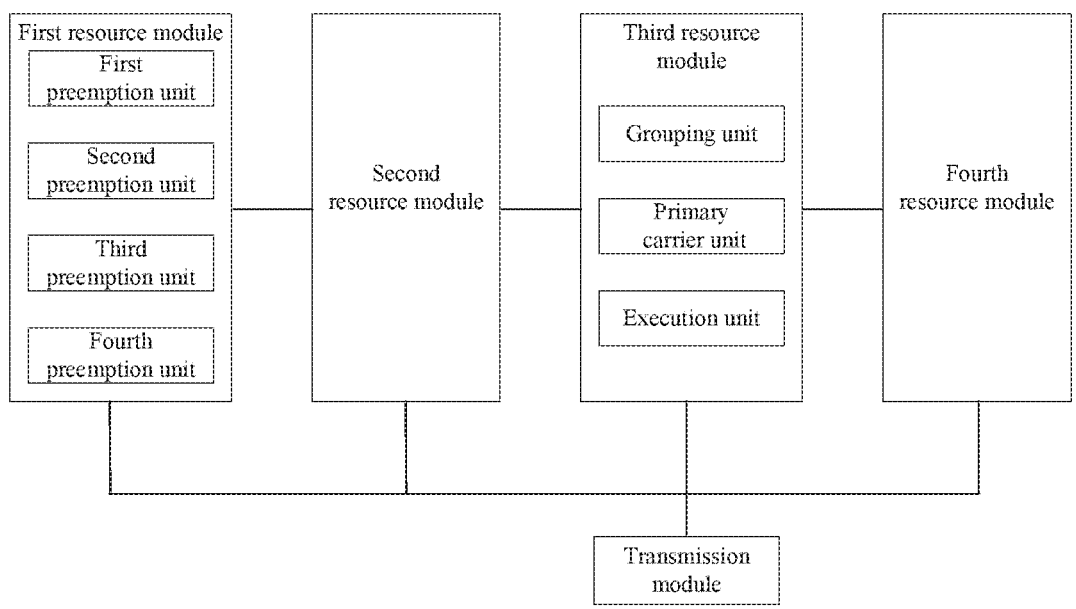
FIG. 2 is a schematic structural diagram of an apparatus for performing LBT on multiple unlicensed carriers according to an embodiment of the present invention.

The following describes embodiments of the present disclosure with reference to accompanying drawings. It should be noted that, in the case of no conflict, the embodiments in the present disclosure and features in the embodiments may be arbitrarily combined with each other.

As shown in FIG. 1, an embodiment of the present disclosure provides a method for performing LBT on multiple unlicensed carriers, and the method includes the following steps.

A station performs an individual LBT mechanism on each unlicensed carrier of unlicensed carriers to be aggregated to acquire a right to use the corresponding unlicensed carrier.

Alternatively, the station configures a same LBT mechanism for the unlicensed carriers to be aggregated and performs a unified LBT mechanism on each of the unlicensed carriers to be aggregated to acquire the right of the corresponding unlicensed carrier.

Alternatively, the station groups the unlicensed carriers to be aggregated, performs a corresponding LBT mechanism on each group of unlicensed carriers to acquire a right to use the each group of unlicensed carriers.

Alternatively, the station selects a plurality of unlicensed carriers for performing the LBT mechanism, the number of plurality of unlicensed carriers being greater than a planned number of unlicensed carriers; and after unlicensed carriers of the planned number among the plurality of unlicensed carriers are obtained in performing of the LBT mechanism, the station stops performing the LBT mechanism on the remaining unlicensed carriers.

In the embodiment of the present invention, the station performs LBT on unlicensed carriers to be aggregated, and performs an independent LBT mechanism for each unlicensed carrier; or the station performs a unified LBT mechanism on each unlicensed carrier by means of configuration; or the station groups the unlicensed carriers to be aggregated, and then performs the LBT mechanism; or the station selects a plurality of unlicensed carriers the number of which is greater than the planned number of unlicensed carriers for LBT. It is possible to implement that, when a plurality of unlicensed carriers are required to be aggregated, using rights of the plurality of unlicensed carriers are rapidly and simultaneously acquired by the station, so that aggregating the unlicensed carriers is facilitated.

The method further includes: data is transmitted on the unlicensed carriers, whose rights of use are obtained, in a carrier aggregation manner.

It is assumed that the station needs to contend for multiple unlicensed carriers for carrier aggregation, Listen-Before-Talk (LBT) mechanism of two unlicensed carriers will be illustrated below. The two unlicensed carriers are denoted as CC1 and CC2.

When the station plans to use unlicensed carriers for aggregation during performing LBT, the station performs initial CCA (Clear Channel Assessment), and will generate a random back-off value N if it is detected that a channel is idle. Then, the station performs a CCA with a delay period (alternatively, it may be configured as 0), and performs eCCA (Extended Clear Channel Assessment) detection if it is detected that the channel is idle, where the value of N is counted down by 1 each time the station detects that the channel is idle. When N=0, the station acquires the use rights of the unlicensed carrier. If the station performed LBT on the CC1 and also performed LBT on the CC2, then it is possible that due to different start times of performing LBT on the two carriers or different random back-off values N as well as different actual busy/idle in the two carriers, it is likely that the station may not simultaneously acquire the using rights of the CC1 and the CC2, which causes a result that aggregating the unlicensed carriers may not be implemented at a high probability.

Accordingly, embodiments of the present disclosure propose the following solutions for the station to perform the independent LBT mechanism on each unlicensed carrier of unlicensed carriers to be aggregated to acquire the right to use the unlicensed carrier.

In a first manner, when the station performs the LBT mechanism on unlicensed carriers to be preempted and planned to be aggregated, the station uses a same random number N in random back-off of the unlicensed carriers to be preempted. When extended Clear Channel Assessment (eCCA) detections on a plurality of unlicensed carriers simultaneously indicate idle, the value of N is counted down, and when the value of N is 0, the plurality of unlicensed carriers are all preempted by the station.

In a second manner, the station determines the unlicensed carriers to be preempted and planned to be aggregated, and performs LBT on the plurality of unlicensed carriers separately, and generates an independent random value N for each of the plurality of unlicensed carriers. When the station successfully contends for one unlicensed carrier of the plurality of unlicensed carriers, the station obtains a priority in the preemption of an unlicensed carrier at a frequency point within a first preset range around the one unlicensed carrier for which the station successfully contended, until the plurality of unlicensed carriers are preempted by the station.

In a third manner, when the station already has a right to use a unlicensed carrier and the station aggregates unlicensed carriers at a frequency point within a second preset range, the station has a priority in the preemption for aggregating the unlicensed carriers at the frequency point within the second preset range, until the plurality of unlicensed carriers are preempted by the station.

In a fourth manner, when the station performs the LBT on the unlicensed carriers to be preempted and planned to be aggregated and an interval from preempting one unlicensed carrier of the unlicensed carriers to be preempted by the station to an opportunity of successful preemption is less than or equal to a third preset range, the station initiates clear channel assessment (CCA) on other unlicensed carriers to be aggregated, when consecutive eCCAs within the third preset range are all detected as idle, the station has the right to use the one unlicensed carrier. The station proceeds to perform the eCCAs on the unlicensed carrier which has an interval of being preempted successfully within the third preset range, and when consecutive eCCAs within the third preset range are all detected as idle, the station has the right to use the unlicensed carrier.

For the first manner, when the station performs LBT on the unlicensed carriers to be preempted and planned to be aggregated, the station uses the same value of N in random back-off of the unlicensed carriers. Moreover, when eCCAs on two unlicensed carriers are simultaneously detected as idle, the value of N is counted down. As such, the decrement of the value of N is uniform, which may ensure that multiple unlicensed carriers are preempted simultaneously by the station.

Start times of performing the LBT on the CC1 and the CC2 by the station may be different. In this way, different busy/idle caused by different loads in each unlicensed carrier may be randomized.

For the second manner, the station determines unlicensed carriers to be preempted and planned to be aggregated, and performs LBT separately, and a random back-off value of each unlicensed carrier is independently generated. When the station successfully contends for a certain unlicensed carrier, the station has a high preemption priority for an unlicensed carrier of a neighboring frequency point of this unlicensed carrier. Such a high preemption priority is set by setting relevant parameters in the process of performing the LBT.

For the third manner, when the station already has the right to use a certain unlicensed carrier and the station needs to aggregate the unlicensed carriers of the neighboring frequency point, the station has a high preemption priority for aggregating the unlicensed carriers of the neighboring frequency point.

The second manner and the third manner are also suitable for preempting unlicensed carriers of non-neighboring frequency points. Due to close to the frequency point, the unlicensed carrier of the neighboring frequency point produces, when being used, severe out-of-band leakage to another unlicensed carrier, which may affect a busy/idle detection result of the neighboring frequency point. Therefore, the neighboring frequency point is preferably used by aggregating, which may avoid the out-of-band leakage and improve the carrier utilization efficiency.

For the fourth manner, when the station performs LBT on unlicensed carriers to be preempted and planned to be aggregated, the station performs a process of FIG. 1 on one unlicensed carrier (CC1) of the unlicensed carriers. When the station is about to succeed, for example, the N is decremented to M (the M is a smaller value, in this example, 2), the station may initiate the CCA detection on the other unlicensed carrier (CC2) to be aggregated, at this time, only two consecutive eCCAs need to be performed, and if detection results both indicate idle, the station acquires the use to use this CC2. For the CC1, the station proceeds to perform eCCA detection. If two detection both indicate idle, the value of N is decremented to 0, and the station acquires the right to use the CC1. At this time, the station simultaneously acquires the right to use the unlicensed carrier CC1 and the right to use the unlicensed carrier CC2.

When the station proceeds to perform eCCA detection on the CC1 and the station is detected to be busy, then the station performs the process in accordance with FIG. 1; meanwhile, the station stops detection on the CC2. Because it is expected that the station may not acquire the right to use the CC1 in M eCCA detections on the CC1, the station may not acquire the right to use the CC1 and the right to use the CC2 simultaneously even the station acquires the right to use the CC2, so that the detection on the CC2 is suspended.

The following continues in accordance with the manner described in the first paragraph above except that the M value is further reduced.

The station sets the preemption priority by setting parameters in the process of performing the LBT.

For the fourth manner, the duration of the last eCCA detection is increased.

The duration of the last eCCA detection in which the N is decremented is increased, for example, which is equal to the duration of the initial CCA or a duration of the CCA with delay period.

In this way, on the basis of the fourth manner, when the N of the CC1 is 1, the station initiates CCA detection on the CC2, and the duration of which is equal to the duration of the last eCCA detection on the CC1. When CCA detection results indicate that the CC1 and the CC2 are idle, the station acquires the right to use the CC1 and the right to use the CC2.

The station continues to perform eCCA detection on the unlicensed carriers whose successful preemption opportunity are less than or equal to the third preset range, and after results of the consecutive eCCA detections within the third preset range are all idle, the method further includes:

the station performs CCA detection on unlicensed carriers to be preempted and planned to be aggregated; and when CCA detection indicates idle, the station acquires the right to use the unlicensed carriers.

For the fourth manner, the station performs eCCA detection on the CC1, and when the N is decremented to 0, the station performs another CCA detection, for example, which is equal to the duration of the initial CCA or the duration of the CCA with delay period. Meanwhile, the station initiates CCA detection on the CC2 and the duration of the CCA detection is equal to that of the CCA detection increased or decreased on the CC1.

When t the CC1 and the CC2 are detected to be idle, the station acquires the right to use the CC1 and the right to use the CC2.

For LBT contention for aggregating a plurality of unlicensed carriers by the station, a component carrier group is introduced (that is, for unlicensed carrier grouping contention). That the station groups the unlicensed carriers to be aggregated, and performs a corresponding LBT mechanism on each group to acquire a right to use each group of unlicensed carriers includes:

continuous ones of the unlicensed carriers to be aggregated are grouped into a group; or a plurality of unlicensed carriers among the unlicensed carriers to be aggregated are grouped into a group, carrier component differences of the plurality of unlicensed carriers being less than a fourth preset range; or a plurality of unlicensed carriers are grouped according to an indication signaling.

a primary unlicensed carrier PLAAcell in each group of unlicensed carriers is determined; and The LBT is performed based on each group of unlicensed carriers according to the determined PLAAcell.

That performing of LBT based on each group of unlicensed carriers according to the determined PLAAcell includes one of the following:

In a first manner, the LBT is performed on each unlicensed carrier in each group of unlicensed carriers independently; and when the right to use the PLAAcell of the each group of unlicensed carriers is obtained, the number of eCCA detections for other unlicensed carriers in the each group of unlicensed carriers is reduced.

In a second manner, the LBT is performed on each unlicensed carrier in each group of unlicensed carriers independently; and when the right to use the PLAAcell of the each group of unlicensed carriers is obtained, a contention back-off window for other unlicensed carriers in the each group of unlicensed carriers is reduced.

In a third manner, LBT is performed on each unlicensed carrier in each group of unlicensed carriers independently; and when the right to use the PLAAcell of the each group of unlicensed carriers is obtained, the right to use other unlicensed carriers in the each group of unlicensed carriers is determined and obtained according to a time difference between a duration in which other unlicensed carriers in the each group of unlicensed carriers are detected to be idle at this time and a moment when the right to use the PLAAcell in the each group of unlicensed carriers is obtained.

In a fourth manner, LBT is performed on each unlicensed carrier in each group of unlicensed carriers with the each unlicensed carrier as a carrier, and when a detection indicates that the each unlicensed carrier is idle, the right to use the each unlicensed carrier of the each group of unlicensed carriers is obtained.

For the first manner, LBT is performed on each unlicensed carrier within the group independently. After the right to use the PLAAcell is acquired, the value of N of the LBT on the neighboring Scell (a neighboring frequency point) is decreased by Z when seizing the PLAAcell ends/begins to seize the PLAAcell/during seizing the PLAAcell. Optionally, Z may be 1 or 2. Alternatively, eCCA back-off will not be performed and only the initial CCA will be performed directly.

For the second manner, LBT is performed on each cell within the group independently. After the PLAAcell is preempted successfully, LBT is continuously performed on the neighboring scell. After the preemption of this eCCA ends, the window length of a contention back-off window is reduced at the beginning of the next LBT process.

For the third manner, the process of determining and acquiring the use rights of other unlicensed carriers within the group according to a time difference between a duration in which other unlicensed carriers in the group are detected to be idle at this time and a moment when the right to use the PLAAcell in the group is obtained includes:

When a time difference between a duration in which an unlicensed carrier other than the PLAAcell in the group is detected to be idle at this time and the moment when the right to use the PLAAcell in the group is obtained is greater than a preset duration, the right to use the unlicensed carrier is obtained. When the time difference between the duration in which the unlicensed carrier is detected to be idle at this time and the moment when the right to use the PLAAcell in the group is obtained is less than or equal to the preset duration, the right to use the unlicensed carrier is abdicated.

Alternatively, when a time difference between the moment when the right to use the PLAAcell in the group of unlicensed carriers is obtained and a sum of the duration in which the unlicensed carrier other than the PLAAcell in the group of unlicensed carriers is detected to be idle at this time and a duration of signal sending is greater than the preset duration, the right to use the unlicensed carrier is obtained. When the time difference between the moment when the right to use the PLAAcell in the group of unlicensed carriers is obtained and the sum of the duration in which the unlicensed carrier other than the PLAAcell in the each group of unlicensed carriers is detected to be idle at this time and the duration of signal sending is less than or equal to the preset duration, the right to use the unlicensed carrier is abdicated.

After the PLAAcell within the group preempts a resource, a duration in which a detection indicates that the Scell is idle immediately before the PLAAcell preempts the resource is determined as X, and if the X is greater than K (for example, K is 34 us, 25 us or 9 us), then the Scell resource is directly used, otherwise, a neighboring Scell is discarded; or after the PLAAcell within the group preempts the resource, the resource is used for sending a seizing signal or data after Y durations; the duration in which the detection indicates that the Scell is idle immediately before the PLAAcell preempts the resource is determined as X, and if (X+Y) is larger than K (for example, K is 34 us, 25 us or 9 us), the Scell resource is directly used; and otherwise, the neighboring Scell is discarded. Optionally, Y may be selected as 8 us, 9 us, 17 us, 24 us or 25 us.

For the fourth manner, one component carrier group is considered as a virtual carrier (large system bandwidth), and each component carrier is considered as a sub-band. LBT is performed based on the virtual carrier, and all idle carriers within the group are denoted as idle.

When the PLAAcell acquires the use right and the Scell does not acquire the use right, one or more OFDM (Orthogonal Frequency Division Multiplexing) symbols of first OFDM symbols of each sub-frame (including a partial sub-frame), for sending the data, of the PLAAcell is used as a CCA detection moment of the Scell, each OFDM symbol may include one or two discrete CCA detections, the PLAAcell is seized by a reservation signal at the remaining time, the duration of the CCA detection is 20 us or 30 us. As long as one CCA is idle, then the Scell is available, and the seizing duration is a seizing duration of the PLAAcell.

The process of determining a primary unlicensed carrier PLAAcell within each group of unlicensed carriers includes:

LBT is performed for each unlicensed carrier in the each group of unlicensed carriers, and an unlicensed carrier, whose right of use is firstly obtained, is determined as the PLAAcell of the group.

Or, in the case of performing the LBT for each unlicensed carrier in the each group of unlicensed carriers and simultaneously obtaining the right to use more than one unlicensed carriers, the more than one unlicensed carriers are determined as the PLAAcells of the group of unlicensed carriers, or one of the more than one unlicensed carriers is selected as the PLAAcell of the group of unlicensed carriers.

Or, LBT is performed on each unlicensed carrier in the each group of unlicensed carriers, and the PLAAcell of the group is determined according to a preset setting.

The process of determining the PLAAcell of the group according to a preset setting includes: an unlicensed carrier of the lowest frequency point is used as the PLAAcell of the group.

In this embodiment of the present disclosure, selecting a PLAAcell (still an unlicensed carrier) within a component unlicensed carrier group includes: when LBT is performed on each unlicensed carrier independently, an unlicensed carrier, a random back-off N value of which is firstly counted down to 0, is configured as the PLAAcell (primary unlicensed carrier). When N values of multiple unlicensed carriers are simultaneously counted down to 0, multiple PLAAcells may exist or one of the multiple unlicensed carriers may be selected as the PLAAcell. Or, a certain unlicensed carrier is pre-determined as a PLAAcell.

As shown in FIG. 2, an embodiment of the present invention provides an apparatus for performing LBT on multiple unlicensed carriers, which is applied to a station and includes:

a first resource module, which is configured to perform an individual LBT mechanism on each of unlicensed carriers to be aggregated to obtain a right to use the each of the unlicensed carriers;

or a second resource module, which is configured to configure a same LBT mechanism for the unlicensed carriers to be aggregated, and perform a unified LBT mechanism on each of the unlicensed carriers to be aggregated to obtain the right to use each of the unlicensed carriers;

or a third resource module, which is configured to group the unlicensed carriers to be aggregated, and perform a corresponding LBT mechanism on each group of unlicensed carriers to obtain a right to use the each group of unlicensed carriers;

or a fourth resource module, which is configured to select a plurality of unlicensed carriers for performing the LBT mechanism, the number of plurality of unlicensed carriers being greater than a planned number of unlicensed carriers; and after unlicensed carriers of the planned number among the plurality of unlicensed carriers is obtained in performing of the LBT mechanism, and stop performing the LBT mechanism on the remaining unlicensed carriers.

The apparatus further includes a transmission module, which is configured to: transmit data on the unlicensed carriers, whose rights of use are obtained, in a carrier aggregation manner.

The first resource module includes:

a first preemption unit, which is configured to: when the station performs the LBT mechanism on unlicensed carriers to be preempted and planned to be aggregated, use a same random number N in random back-off of the unlicensed carriers to be preempted; when eCCA detections of a plurality of unlicensed carriers simultaneously indicate idle, decrement a value of N; and when the value of N is 0, the plurality of unlicensed carriers are preempted by the station simultaneously;

or a second preemption unit, which is configured to: determine the unlicensed carriers to be preempted and planned to be aggregated, and performing LBT on the plurality of unlicensed carriers separately, and generate an independent random value N for each of the plurality of unlicensed carriers; when successfully contending for one unlicensed carrier of the plurality of unlicensed carriers, obtain a priority in the preemption of a unlicensed carrier at a frequency point within a first preset range around the one unlicensed carrier for which the station successfully contended until the plurality of unlicensed carriers are preempted;

or a third preemption unit, which is configured to: when the station already has a right to use an unlicensed carrier and aggregates unlicensed carriers at a frequency point within a second preset range around the unlicensed carrier, obtain a priority in the preemption for aggregating the unlicensed carriers at the frequency point within the second preset range, until the plurality of unlicensed carriers are preempted;

or a fourth preemption unit, which is configured to: when the station performs the LBT on the unlicensed carriers to be preempted and planned to be aggregated and an interval from preempting one unlicensed carrier of the unlicensed carriers to be preempted by the station to a moment of successful preemption is less than or equal to a third preset range, initiate CCA detections on other unlicensed carriers to be aggregated, when consecutive eCCA detections within the third preset range all indicate idle, obtain the right to use the one unlicensed carrier; proceed to perform by the station the eCCA detections on the unlicensed carrier which has an interval of being preempted successfully within the third preset range, and when consecutive eCCA detections within the third preset range all indicate idle, obtain the right to use the unlicensed carrier.

The second preemption unit and the third preemption unit are further configured to set the priority in the preemption by setting a parameter involved in performing the LBT, and increase the duration of a last one of the successive eCCA detections within the third preset range.

The fourth preemption unit is further configured to perform the CCA detections on the unlicensed carriers to be preempted and planned to be aggregated; and when the CCA detections indicate idle, obtain the right to use the unlicensed carriers.

The third resource module includes:

a grouping unit, which is configured to group continuous ones of the unlicensed carriers to be aggregated into a group; or group a plurality of unlicensed carriers among the unlicensed carriers to be aggregated into a group, carrier component differences of the plurality of unlicensed carriers being less than a fourth preset range; or group a plurality of unlicensed carriers according to an indication signaling;

a primary carrier unit, which is configured to determine a primary unlicensed carrier PLAAcell for each group of unlicensed carriers; and an execution unit, which is configured to perform the LBT based on each group of unlicensed carriers according to the determined PLAAcell.

The performing unit includes one of the following:

a first component subunit, which is configured to perform the LBT on each unlicensed carrier in each group of unlicensed carriers independently; and when the right to use the PLAAcell of the each group of unlicensed carriers is obtained, reduce a number of eCCA detections for other unlicensed carriers in the each group of unlicensed carriers;

or a second component subunit, which is configured to perform the LBT on each unlicensed carrier in each group of unlicensed carriers independently; and when the right to use the PLAAcell of the each group of unlicensed carriers is obtained, decrement a contention back-off window for other unlicensed carriers in the each group of unlicensed carriers;

a third component subunit, which is configured to perform the LBT on each unlicensed carrier in each group of unlicensed carriers independently; and when the right to use the PLAAcell of the each group of unlicensed carriers is obtained, determine and obtain the right to use other unlicensed carriers in the each group of unlicensed carriers according to a time difference between a duration in which other unlicensed carriers in the each group of unlicensed carriers are detected to be idle at this time and a moment when the right to use the PLAAcell in the each group of unlicensed carriers is obtained;

or a fourth component subunit, which is configured to perform the LBT on each unlicensed carrier in each group of unlicensed carriers with the each unlicensed carrier as a carrier, and when a detection indicates that the each unlicensed carrier is idle, obtain the right to use the each unlicensed carrier of the each group of unlicensed carriers.

The third component subunit is configured to: when a time difference between a duration in which an unlicensed carrier other than the PLAAcell in the each group of unlicensed carriers is detected to be idle at this time and the moment when the right to use the PLAAcell in the each group of unlicensed carriers is obtained is greater than a preset duration, obtain the right to use the unlicensed carrier; when the time difference between the duration in which the unlicensed carrier is detected to be idle at this time and the moment when the right to use the PLAAcell in the each group of unlicensed carriers is obtained is less than or equal to the preset duration, abdicate the right to use the unlicensed carrier;

or when a time difference between the moment when the right to use the PLAAcell in the each group of unlicensed carriers is obtained and a sum of the duration in which the unlicensed carrier other than the PLAAcell in the each group of unlicensed carriers is detected to be idle at this time and a duration of signal sending is greater than the preset duration, obtain the right to use the unlicensed carrier; when the time difference between the moment when the right to use the PLAAcell in the each group of unlicensed carriers is obtained and the sum of the duration in which the unlicensed carrier other than the PLAAcell in the each group of unlicensed carriers is detected to be idle at this time and the duration of signal sending is less than or equal to the preset duration, abdicate the right to use the unlicensed carrier.

The primary carrier unit is configured to:

perform the LBT for each unlicensed carrier in the each group of unlicensed carriers, and determine an unlicensed carrier, whose right of use is firstly obtained, as the PLAAcell of the each group of unlicensed carriers;

or in the case of performing the LBT for each unlicensed carrier in the each group of unlicensed carriers and simultaneously obtaining the right to use more than one unlicensed carriers, determine the more than one unlicensed carriers as the PLAAcells of the each group of unlicensed carriers, or select one of the more than one unlicensed carriers as the PLAAcell of the each group of unlicensed carriers;

or perform the LBT on each unlicensed carrier in the each group of unlicensed carriers, and determine the PLAAcell of the each group of unlicensed carriers according to a preset setting.

The primary carrier unit is further configured to take an unlicensed carrier at a lowest frequency point in the each group of unlicensed carriers as the PLAAcell of the each group of unlicensed carriers.

Figure 3:
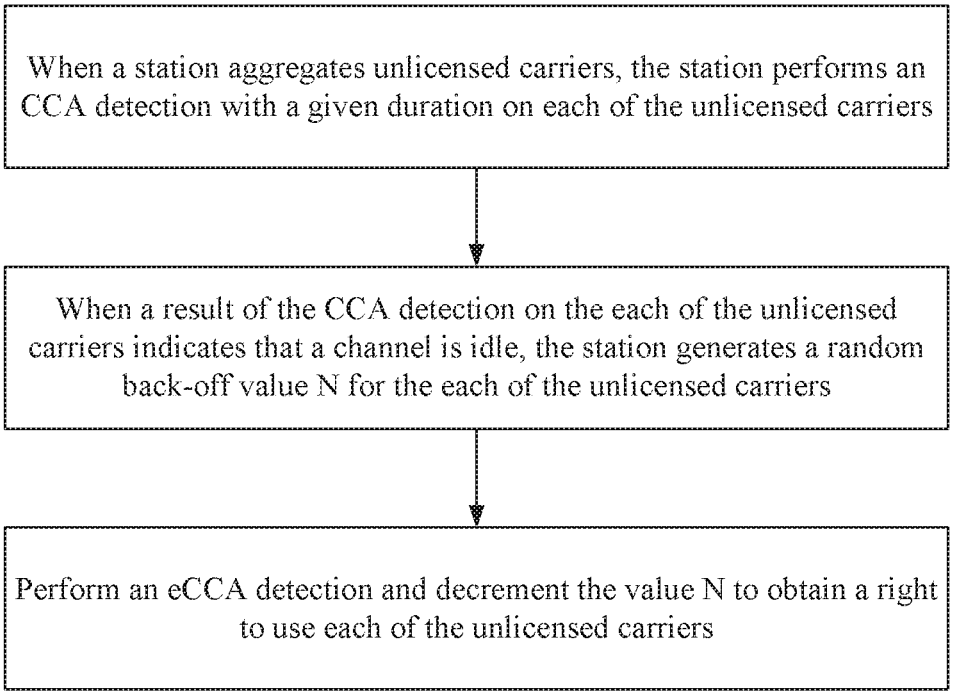
FIG. 3 is a flowchart of another method for performing LBT on multiple unlicensed carriers according to an embodiment of the present invention.

As shown in FIG. 3, an embodiment of the present disclosure further provides a method for performing LBT on multiple unlicensed carriers, including:

When a station aggregates unlicensed carriers, performing, the station performs an (CCA) detection with a given duration on each of the unlicensed carriers; when a result of the CCA detection on the each of the unlicensed carriers indicates that a channel is idle, the station generates a random back-off value N for the each of the unlicensed carriers; and an eCCA detection is performed and the value of N is counted down to obtain a right to use each of the unlicensed carriers;

The station uses a same random back-off value N in random back-off of all of the unlicensed carriers.

the CCA detection with the given duration is an initial CCA detection;

before the eCCA detection, and after the CCA detection with the given duration, the method further includes: performing, by the station, a CCA detection with a duration of a delay period; and performing the eCCA detection when a result of the CCA detection with the duration of the delay period indicates that the channel is idle.

In this embodiment, when the station plans to use an unlicensed carrier for aggregation during performing the LBT, the station performs initial CCA. If an initial CCA detection result indicates that the channel is clear, the station generates a random back-off N value. Then, delay period CCA is performed (alternatively, it may be configured as 0), if a CCA detection result indicates that the channel is clear, then eCCA detection is performed, and the N value is decremented by 1 whenever an eCCA detection result indicates that the channel is clear. Until when N=0, the station acquires the use right of the unlicensed carrier, wherein a decrement rule of the N value is as follows: when eCCA detection results indicate that multiple unlicensed carriers are simultaneously clear, the N value is decremented.

The embodiment provides the following manners:

A First Manner

When the station performs LBT on unlicensed carriers to be preempted and planned to be aggregated, the station uses the same random number N in random back-off of the unlicensed carriers; when eCCA detection results indicate that two unlicensed carriers are simultaneously idle, the N value is decremented. As such, the decrements of the N values are uniform, which may ensure that multiple unlicensed carriers are preempted simultaneously by the station.

Start times of performing the LBT on two unlicensed carriers by the station may be different. In this way, different duty cycles caused by different loads in each unlicensed carrier may be randomized.

A Second Manner

The station determines unlicensed carriers to be preempted and planned to be aggregated, and performs LBT respectively, and a random back-off value of each unlicensed carrier is independently generated.

For multiple unlicensed carriers that are to be contended by a station, a condition for decrementing a random back-off N value includes: CCA/eCCA detection is performed on different unlicensed carriers, the N value is decremented independently; or the N value of one unlicensed carrier is decremented, the N value of the other unlicensed carrier is decremented as well, for example, if an N value of a primary unlicensed carrier is decremented, an N value of a secondary unlicensed carrier is decremented as well;

For multiple unlicensed carriers that are to be contended by the station, a condition for terminating the decrement of the random back-off N value (it is considered that the right to use the unlicensed carrier is acquired after the termination of the decrement of the random back-off N value) includes: the random back-off N value of each unlicensed carrier is decremented to 0; or one random back-off N value of multiple unlicensed carriers where the LBT is performed simultaneously is decremented to 0, or the random back-off N values of multiple unlicensed carriers are all decremented to 0.

In the embodiment, when performing the CCA with the given duration on each of the unlicensed carriers, the station independently generates a same contention back-off window for each of the unlicensed carriers, or the station negotiates with other stations to generate a same contention back-off window for each of the unlicensed carriers. When performing the CCA with the given duration on each of the unlicensed carriers, the station independently generates a same random back-off value N for each of the unlicensed carriers, or the station negotiates with other stations to generate a same random back-off value N for each of the unlicensed carriers.

In the embodiment, when performing CCA on the multiple unlicensed carriers respectively, the station generates an N value according to a size of a contention back-off window of one unlicensed carrier of the multiple unlicensed carriers. This unlicensed carrier of the multiple unlicensed carriers is a carrier with the largest or smallest contention back-off window of the multiple unlicensed carriers.

The following will be illustrated by means of LBT mechanisms of two unlicensed carriers. The two unlicensed carriers are denoted as CC1 and CC2. The station performs an eCCA process on the CC1 and the CC2. A random back-off N value is firstly generated, may be generated according to a contention back-off window of a certain CC, for example, an N value is generated according to the CC of a smaller contention back-off window, or an N value is generated according to the CC of a larger contention back-off window, or may also be predetermined in advance.

Both the CC1 and the CC2 use the same N value for the back-off of eCCA detection. The delay period CCA is firstly performed, and the delay period CCA may be configured as 0 when being in contention for multi-carrier aggregation, that is, the delay period CCA is not performed. If the delay period CCA is performed, the station enters the eCCA process only when it detects that both the CC1 and the CC2 are simultaneously idle. For the eCCA detection, the station is also required to detect that both the CC1 and the CC2 are simultaneously idle, the random back-off N value will be decremented. When the eCCA detection result indicates that one of the CCs is non-idle, it is required to enter the delay period CCA for both the CCs. This is repeated until the N value is 0, and then the station acquires the right to use CC1 and the right to use CC2.

Figure 4:
FIG. 4 is a schematic structural diagram of another apparatus for performing LBT on multiple unlicensed carriers according to an embodiment of the present invention.

As shown in FIG. 4, an embodiment of the present disclosure further provides an apparatus for performing LBT on multiple unlicensed carriers, including:

A first detection module, which is configured to when a station aggregates unlicensed carriers, perform a CCA detection with a given duration on each of the unlicensed carriers;

a processing module, which is configured to: when a result of the CCA detection on the each of the unlicensed carriers indicates that a channel is idle, generate a random back-off value N for the each of the unlicensed carriers; and A second detection module, which is configured to perform an eCCA detection to decrement the value of N to obtain a right to use each of the unlicensed carriers.

The station uses a same random back-off value N in random back-off of all of the unlicensed carriers.

In this embodiment, the CCA detection with the given duration is an initial CCA detection.

The apparatus further includes a third detection module, which is configured to: before the eCCA detection and after the CCA detection with the given duration, perform a CCA detection with a duration of a delay period; and The second detection module is configured to perform the eCCA detection when a result of the CCA detection with the duration of the delay period indicates that the channel is idle.

The decrement rule of the N value is as follows: when eCCA detection results indicate that multiple unlicensed carriers are simultaneously idle, the N value is counted down.

Alternatively, the first detection module is configured to: when performing the CCA with the given duration on each of the unlicensed carriers, independently generate a same contention back-off window for each of the unlicensed carriers, or negotiate with other stations to generate the same contention back-off window for each of the unlicensed carriers.

Alternatively, the first detection module is configured to, when performing the CCA with the given duration on each of the unlicensed carriers, independently generate the same random back-off value N for each of the unlicensed carriers, or negotiate with other stations to generate the same random back-off value N for each of the unlicensed carriers.

The processing module is configured to: when the first detection module performs CCA on the multiple unlicensed carriers, respectively, generate an N value according to a size of a contention back-off window of one unlicensed carrier of the multiple unlicensed carriers. The one unlicensed carrier of the multiple unlicensed carriers is a carrier with the largest or smallest contention back-off window of the multiple unlicensed carriers.

This application will be illustrated by means of multiple embodiments.

A First Embodiment

It is assumed that the station needs to contend for multiple unlicensed carriers for carrier aggregation, it will be illustrated below by means of LBT mechanisms for two unlicensed carriers. The two unlicensed carriers are denoted as CC1 and CC2.

When the station plans to use unlicensed carriers for aggregation during performing LBT, the station performs initial CCA, and will generate a random back-off N value if detecting that a channel is idle. Then, the station performs delay period CCA (alternatively, it may be configured as 0), and then the station performs eCCA detection if detecting that the channel is idle. The N value is decremented by 1 each time the station detects that the channel is idle. When N is 0, the station acquires the right to use the unlicensed carriers. If the station performed LBT on the CC1 and also performed LBT on the CC2, it is possible that due to different start times of performing LBT on the two carriers or different random back-off N values as well as different actual busy/idle in the two carriers, the station may not simultaneously acquire the use rights of both the CC1 and the CC2 at a high probability, which causes a result that aggregating the unlicensed carriers cannot be implemented at a high probability.

The embodiments of the present disclosure propose the following manners.

A First Manner

When the station performs LBT on unlicensed carriers to be preempted and planned to be aggregated, the station uses the same random number N in random back-off of the unlicensed carriers. Moreover, when eCCA detection results indicate that two unlicensed carriers are simultaneously idle, the N value is decremented. As such, the decrements of the N values of the two unlicensed carriers are uniform, which may ensure that multiple unlicensed carriers are preempted simultaneously by the station.

Start times of performing the LBT on the CC1 and the CC2 by the station may be different. In this way, different busy/idle caused by different loads in each unlicensed carrier may be randomized.

A Second Manner

The station determines unlicensed carriers to be preempted and planned to be aggregated, and performs LBT respectively, and a random back-off value of each unlicensed carrier is independently generated. When the station successfully contends for an unlicensed carrier, the station has a high priority in preempting unlicensed carriers of frequency points adjacent to this unlicensed carrier. Such a high preemption priority is set by setting relevant parameters in the process of performing the LBT.

or when the station already has the right to use a certain unlicensed carrier, and when the station needs to aggregate the unlicensed carriers of the neighboring frequency points, the station has a high preemption priority for aggregating the unlicensed carriers of the neighboring frequency points.

Such a manner is also suitable for preempting unlicensed carriers of non-neighboring frequency points. Due to close to the frequency point, the unlicensed carrier of the neighboring frequency point produces, when being used, severe out-of-band leakage to another unlicensed carrier, which may affect a busy/idle detection result of the neighboring frequency point. Therefore, the neighboring frequency point is preferably used by aggregating, which may avoid the out-of-band leakage and improve the carrier utilization efficiency.

A Third Manner

When the station performs LBT unlicensed carriers to be preempted and planned to be aggregated, the station performs a process of FIG. 1 on one unlicensed carrier (CC1) of the unlicensed carriers. When the station is about to succeed, for example, the N is decremented to M (the M is a smaller value, in this example, 2), the station may initiate the CCA detections on the other unlicensed carrier (CC2) to be aggregated. Therefore, only two consecutive eCCAs need to be performed. If detection results both indicate that the unlicensed carrier is idle, the station acquires the right to use CC2. For the CC1, the station then performs eCCA detection. If both detection results indicate that the unlicensed carriers are idle, the N value is decremented to 0, and the station acquires the right to use the CC1. At this time, the station simultaneously acquires the right to use the unlicensed carrier CC1 and the right to use the unlicensed carrier CC2.

When the station proceeds to perform eCCA detection on the CC1 and the station is detected to be busy, then the station performs the process in accordance with FIG. 1; meanwhile, the station stops detection on the CC2. Because it is expected that the station may not acquire the right to use the CC1 in M eCCA detections on the CC1, the station may not acquire the right to use the CC1 and the right to use the CC2 simultaneously even the station acquires the right to use the CC2, so that the detection on the CC2 is suspended.

The following continues in accordance with the manner described in the first paragraph above except that the M value is further reduced.

A Fourth Manner

Relative to the third manner and the fourth manner, the duration in which the N is decremented in the last eCCA detection needs to be increased, for example, the duration is equal to the duration of the initial CCA or the duration of the delay period CCA.

In this way, on the basis of the third manner, when the N of the CC1 is 1, the station initiates CCA detection on the CC2, and the duration of the CCA detection on the CC2 is equal to the duration of the last eCCA detection on the CC1. When CCA detection results indicate that the CC1 and the CC2 are idle, the station acquires the right to use the CC1 and the right to use the CC2.

A Fifth Manner

Relative to the third manner, in the fifth manner, the station performs eCCA detection on the CC1, and when the N is decremented to 0, the station performs another CCA detection, for example, the duration of the another CCA detection is equal to the duration of the initial CCA or the duration of the delay period CCA. Meanwhile, the station initiates CCA detection on the CC2, the duration of which is equal to that of the CCA detection on the CC1 in terms of increase or decrease. When the CCA detection results indicate that the CC1 and the CC2 are idle, the station acquires the right to use the CC1 and the right to use the CC2.

When the station performs LBT on a plurality of unlicensed carriers to be aggregated, contention back-off windows of different unlicensed carriers to-be-contended and randomly-generated N values are uniformly generated or harmoniously determined. Harmoniously determining is to mainly negotiate the same N value for different unlicensed carriers by the station.

For multiple unlicensed carriers that are to be contended by a station, a condition for decrementing a random back-off N value includes: CCA/eCCA detection is performed on different unlicensed carriers (CC), the N value is decremented independently; or the N value of one CC is decremented, the N value of the anther CC is decremented as well, for example, if an N value of a primary unlicensed carrier is decremented, an N value of a secondary unlicensed carrier is decremented as well;

For multiple unlicensed carriers that are to be contended by the station, a condition for terminating the decrement of a random back-off N value (it is considered that the right to use the unlicensed carrier is acquired after the termination of the decrement) includes: the random back-off N value of each unlicensed carrier is decremented to 0; or one random back-off N value of multiple unlicensed carriers where the LBT is performed simultaneously is decremented to 0, or the random back-off N values of multiple unlicensed carriers are all decremented to 0.

For a plurality of unlicensed carriers that are to be contended by a station, a random back-off N value of one CC is firstly decremented to 0, and the station sends a seizing signal, for example, the seizing signal is designed to be sent at a time domain interval, for example, the interval is less than 9 us, which may be lasted for a certain duration, for example, one OFDM symbol duration. In this way, the station may keep seizing of the CC firstly acquiring the use right (shield preemption of a WIFI system). For other stations, it is also possible to determine whether it is seized by a licensed assisted access (LAA) station by detecting a pattern of the seizing signal sent at the interval. In this way, the out-of-band leakage of the neighboring frequency point may also be reduced, so that the station performing LBT on the neighboring frequency point can perform eCCA as well.

A Second Embodiment

In the case where station contends for a plurality of unlicensed carriers for aggregating by LBT, a component carrier group is introduced (that is, for unlicensed carrier grouping contention). That the station performs LBT based on the component carrier group includes:

1) grouping component unlicensed carriers: continuous unlicensed carriers (neighboring frequency points) are grouped into a group, or each group of component carriers is indicated by means of a signaling;

2) selecting of a PLAAcell (still an unlicensed carrier) within the component unlicensed carrier group, including: when LBT is performed on each unlicensed carrier independently, the unlicensed carrier whose random back-off N value is firstly decremented to 0 is configured as a PLAAcell (primary unlicensed carrier); and when N values of multiple unlicensed carriers are simultaneously decremented to 0, multiple PLAAcells may be configured as PLAAcells or one of them may be selected as a PLAAcell; or, a certain unlicensed carrier is scheduled as a PLAAcell.

3) performing LBT based on the component carrier groups, including:

a first manner: LBT is performed on each unlicensed carrier within the group independently; after the right to use PLAAcell is acquired, the N value of the LBT on the neighboring Scell (a neighboring frequency point) is decreased by Z when seizing the PLAAcell ends/the beginning of seizing the PLAAcell/during seizing the PLAAcell. Optionally, Z may be as 1 or 2, or eCCA back-off will not be performed and only the initial CCA will be performed directly.

a second manner: LBT is performed on each cell within the group independently. After the PLAAcell is preempted successfully, LBT is performed on the neighboring Scell. After the preemption of this eCCA ends, the window length of a contention back-off window is reduced at the beginning of the next LBT process.

a third manner: after the PLAAcell within the group preempts a resource, a duration in which a detection result indicates that the Scell is idle immediately before the PLAAcell preempts the resource is determined as X, and if the X is greater than K (for example, K is 34 us, 25 us or 9 us), then the resource of the Scell is directly used, otherwise, a neighboring Scell is discarded.

a fourth manner: after the PLAAcell within the group preempts the resource, the resource is used for sending a seizing signal or data after Y durations; the duration in which the detection result indicates that the Scell is idle immediately before the PLAAcell preempts the resource is determined as X, and if (X+Y) is larger than K (for example, K is 34 us, 25 us or 9 us), the resource of the Scell is directly used; and otherwise, the neighboring Scell is discarded. Y may be selected as 8 us, 9 us, 17 us, 24 us or 25 us.

a fifth manner: one component carrier group is considered as a virtual carrier (large system bandwidth), and each component carrier is considered as a sub-band. LBT is performed based on the virtual carrier, and all clear carriers within the group are denoted as idle.

In a sixth manner, the third manner and the fourth manner are further optimized. When the right to use the PLAAcell is acquired and the right to use Scell is not acquired, one or more OFDM symbols of first OFDM symbols of each sub-frame (including a partial sub-frame) of the PLAAcell for sending data is used as a CCA detection moment of the Scell, each OFDM symbol may include one or two discrete detection CCAs, the PLAAcell is occupied by a reservation signal at the remaining time, the CCA detection duration is 20 us or 30 us; as long as one CCA detection result indicates that the Scell is idle, the Scell is available, and the seizing duration is a seizing duration of the PLAAcell.

When LBT is performed under a component carrier group manner or LBT is performed based on the multiple unlicensed carriers based on the primary unlicensed carrier, after the station acquires the right to use the PLAAcell, the station performs high-priority LBT on the corresponding Scell instead of the LBT, for example, when the station acquires the right to use the PLAAcell within the group by means of the LBT, the random N value of the Scell has not yet been backed-off to 0, by this time, the N value of the Scell is decremented in a larger step, for example, once an eCCA detection result indicates that the Scell is idle, the N value is decremented by 2 or more (decremented by 1 originally), or a range of window length producing of the next N of the Scell is scheduled, for example, the eCCA performed on the Scell by the station indicates that the Scell is busy, and then the delay period CCA is performed, and after a CCA detection result indicates that the Scell is idle, the station directly regenerates an N value, by this time, an N value producing range is less than a frozen N value.

When LBT is performed under the component carrier group manner or LBT is performed based on multiple unlicensed carriers based on the primary unlicensed carrier, after the station acquires the right to use the PLAAcell, the station sends a discrete time domain signal (muting short slot), for example, the station sends it for a duration and then stops sending it for a duration, as such, when the Scell and the PLAAcell are neighboring frequency points, the CCA detection on the Scell by the station may be carried out within a time of stopping sending the signal in the PLAAcell by the station, in this way, the problem of inaccurate CCA detection due to the neighboring channel leakage of the PLAAcell to the Scell may be effectively prevented.

A Third Embodiment

The station determines a plurality of unlicensed carriers to be contended. Alternatively, multiple unlicensed carriers to be contended may be determined according to a carrier selection mechanism. For example, the station may consider a carrier with a relatively light load (relatively clean) of the unlicensed carriers as a candidate contention carrier by means of statistics and detection.

The station performs the LBT on the unlicensed carriers to be preempted and planned to be aggregated. It is assumed that the carriers subjected to the LBT by the station are denoted as CC1 and CC2, and processes of processing multiple carriers are similar. The station simultaneously performs initial CCA on the CC1 and the CC2, respectively, when initial CCA detection results indicate that the two carriers are simultaneously idle, the station uses the CC1 and the CC2 to send data (that is, acquires the corresponding use rights); otherwise, the station performs an eCCA process on the CC1 and the CC2. A random back-off N value is generated firstly, may be generated according to a contention back-off window of a certain CC, for example, the N value is generated according to the CC of a smaller contention back-off window, or the N value is generated according to the CC of a larger contention back-off window, or may also be predetermined in advance.

Both the CC1 and the CC2 use the same N value for eCCA detection back-off. The delay period CCA is firstly performed, and the delay period CCA may be configured as 0 when being in contention for multi-carrier aggregation, that is, the delay period CCA is not performed. If the delay period CCA is performed, the station enters the eCCA process only when it detects that both the CC1 and the CC2 are simultaneously idle. For the eCCA detection, the station is also required to detect that both the CC1 and the CC2 are idle simultaneously, and then the random back-off N value will be decremented. When the eCCA detection detects that one of the CCs is non-idle, it is required to enter the delay period CCA for both the CCs. This is repeated until the N value is 0, then the station acquires the right to use the CC1 and the right to use the CC2.

A Fourth Embodiment

The station performs the LBT on the unlicensed carriers to be preempted and planned to be aggregated. It is assumed that the carriers subjected to the LBT by the station are CC1 and CC2, and processes of processing multiple carriers are similar. The station simultaneously performs initial CCA on the CC1 and the CC2, respectively, when initial CCA detection results indicate that the two carriers are simultaneously idle, the station uses the CC1 and the CC2 to send data (that is, acquires the corresponding use rights); otherwise, the station performs an eCCA process on the CC1 and the CC2. A random back-off N values are generated firstly, may be generated according to contention back-off windows of the CC1 and the CC2, which may be denoted as N1 and N2, and N1 is assumed to be smaller than N2.

The station performs eCCA detection on the CC1 and the CC2 to decrement the N value independently. The delay period CCA is performed on them respectively, and the delay period CCA may be configured as 0 when being in contention for multiple carrier aggregation, that is, the delay period CCA is not performed. If the delay period CCA is performed, then the station independently detects the delay period CCA on the CC1 and the CC2, and when CCA detection results indicate that the CC1 and the CC2 are idle, the eCCA detection will be performed on the corresponding CC. The remaining CC is continuously subjected to the delay period CCA, and is finally subjected to eCCA detection.

eCCA detection is independently performed on the CC1 and the CC2. It may be assumed that the N value of the CC1 is firstly backed-off to N1=0. The speed of back-off depends on busy/idle of the CC and the N value. By this time, the right to use the CC1 is acquired, and the station does not complete the detection on the CC2.

At this moment, the station takes the following manner for the eCCA process on the CC2.

The station directly acquires the right to use the CC2, and will not continue the following eCCA process.

The station performs high-priority (or simplified) CCA on the CC2 instead of the previous eCCA process, for example, high-priority CCA is that only one initial CCA is performed on the CC2, and if the initial CCA detection result indicates that the CC2 is idle, then the CC2 is directly used. Or one CCA is performed for other fixed durations, for example, 16 us or 25 us. If the initial CCA detection result indicates that the CC2 is idle, the right to use the CC2 is acquired.

A Fifth Embodiment

Compared to the fourth embodiment, the fifth embodiment has a difference only in the process of the initial CCA. The embodiment will be described as follows.

The station performs the LBT on unlicensed carriers to be preempted and planned to be aggregated. It is assumed that the carriers subjected to the LBT by the station are CC1 and CC2, and processes of processing multiple carriers are similar. The station simultaneously performs initial CCA on the CC1 and the CC2, respectively, when initial CCA detection results indicate that the two carriers are simultaneously idle, the station uses the CC1 and the CC2 to send data (that is, acquires the corresponding use rights); otherwise, the station performs the eCCA on the CC1 and the CC2, so that random back-off N values are generated firstly, may be generated according to contention back-off windows of the CC1 and the CC2, which may be denoted as N1 and N2, and N1 is assumed to be smaller than N2.

The following is the same as the fourth embodiment.

A Sixth Embodiment

The system provides in advance that during carrier aggregation, the unlicensed carriers are divided in advance into a primary contention unlicensed carrier and a corresponding secondary contention unlicensed carrier.

The station always performs an LBT mechanism on a contention primary component carrier. In an eCCA process on the primary contention carrier, when the N is about to decrement to 0 (for example, when the N value is 2), the station initiates performance of high-priority CCA on the secondary component carrier.

When the station performs the LBT on the primary contention carrier until N=2, two consecutive eCCA detection results both indicate that the primary contention carrier is idle, that is, the N is consecutively decremented to 0, the station acquires the right to use the primary contention carrier.

Meanwhile, if high-priority CCA detection on the secondary component carrier by the station indicates that the secondary component carrier is also idle (by this time, the duration of the high-priority CCA is twice the duration of one single eCCA), the station simultaneously acquires the right to use the secondary unlicensed carrier.

If when the station performs the next eCCA detection on the primary contention carrier when N=2, a channel is busy, and the station performs delay period CCA on the primary contention carrier (according to a process of FIG. 1), and then stops CCA detection on the secondary contention carrier. The CCA detection is re-initiated at the next time when a delay period CCA detection result indicates that the channel is idle.

If when the station performs the next eCCA detection on the primary contention carrier when N=1, the channel is busy, and the station performs the delay period CCA (if any), and then stops CCA detection of the secondary contention carrier. The station re-initiates high-priority CCA detection on the secondary contention carrier at the next time when a CCA detection result indicates that the channel is idle (by this time, the duration of the CCA is a duration of one single eCCA). Then, the CCA detection continues according to the above manner.

A Seventh Embodiment

It is assumed that the station plans to aggregate two unlicensed carriers, the station may perform LBT on two or more unlicensed carriers. If the number of unlicensed carriers which the station needs to aggregate is not determined, the station selects as many unlicensed carriers as possible for LBT so as to increase the probability that the unlicensed carriers are contended simultaneously.

In this embodiment, the station performs LBT on three unlicensed carriers, which are respectively denoted as CC1, CC2 and CC3. However, in fact, it is feasible that the station acquires two unlicensed carriers for aggregation.

In this embodiment, the station performs initial CCA simultaneously on the CC1, the CC2 and the CC3, respectively. When the initial CCA detection is performed, if any carrier is detected to be idle, the station may acquire the use right thereof. For example, the station detects that the CC1 and the CC2 are idle, and the CC3 is non-idle, then the station may acquire the right to use the CC1 and the right to use the CC2. If the station is willing to use only the CC1 and the CC2 for aggregation, then the station may end this LBT on multiple carriers. For another example, if the station detects that the CC1 is idle, but the CC2 and the CC3 are non-idle, the station acquires the right to use the CC1; and if the station is willing to only use the CC1 to send data, the station may end this LBT on the multiple carriers.

If the station performs initial CCA detection on the CC1, the CC2 and the CC3 and three CCs are detected to be idle, the station acquires the right to use the CC1, the CC2 and the CC3, and ends this LBT.

It is assumed that the station needs at least two carriers for aggregation, the station performs initial CCA detection, and it is detected that the CC3 is idle, and the CC1 and the CC2 are busy, the station acquires the right to use the CC3, and uses it alone. The station continues to perform the LBT on the remaining CC1 and CC2. The station performs an eCCA process on the CC1 and the CC2. A random back-off N value is generated firstly, and may be generated according to a contention back-off window of a certain CC, for example, the N value is generated according to a CC with a smaller contention back-off, or the N value is produced according to a CC with a larger contention back-off window, and may also be predetermined in advance.

Both the CC1 and the CC2 use the same N value for eCCA detection back-off. The delay period CCA is firstly performed, and the delay period CCA may be configured as 0 when being in contention for multi-carrier aggregation, that is, the delay period CCA is not performed. If the delay period CCA is performed, the station enters the eCCA process only when it detects that both the CC1 and the CC2 are simultaneously idle. For the eCCA detection, the station is also required to detect that both the CC1 and the CC2 are idle simultaneously, and then the random back-off N value will be decremented. When the eCCA detection detects that one of the CCs is non-idle, it is required to enter the delay period CCA for both the CCs. This is repeated until the N value is 0, then the station acquires the right to use the CC1 and the right to use the CC2.

An Eighth Embodiment

It is assumed that the station plans to aggregate two unlicensed carriers, the station may perform LBT on two or more unlicensed carriers. If the number of unlicensed carriers which the station needs to aggregate is not determined, the station selects as many unlicensed carriers as possible for LBT so as to increase the probability that the unlicensed carriers may be contended simultaneously.

In this embodiment, the station performs LBT on three unlicensed carriers, which are respectively denoted as CC1, CC2 and CC3. However, in fact, it is feasible that the station acquires two unlicensed carriers for aggregation.

In this embodiment, the station performs initial CCA simultaneously on the CC1, the CC2 and the CC3, respectively. If the CC1, the CC2 and the CC3 are all busy when the initial CCA detection is performed, the station initiates the eCCA process on the CC1, the CC2 and the CC3.

Firstly, a random back-off N value is generated, which may be generated according to a contention back-off window of a certain CC, for example, the N value is generated according to the CC with a smaller contention back-off window, or the N value is generated according to the CC with a larger contention back-off window, and may also be predetermined in advance. The CC1, the CC2, and the CC3 use the same N value for eCCA detection back-off.

The delay period CCA is performed, and the delay period CCA may be configured as 0 when being in contention for multicarrier aggregation, that is, the delay period CCA is not performed. If the delay period CCA is performed, then the station will enter an eCCA process only if simultaneously detecting that at least two CCs are idle. For the eCCA detection, when the station is also required to simultaneously detect that the number of the unlicensed carriers planned to be aggregated meets the requirement, the random back-off N value will be decremented only when the station detects that the corresponding unlicensed carriers are idle (the decrement of the N value of the non-idle carrier will be stopped, here, the detections are as follows: when eCCA detection indicates that the carriers are simultaneously idle, the N values of the multiple carriers are decremented; and the eCCA detection indicates that the carriers are respectively idle, the N values of the multiple carriers are respectively decremented). When the eCCA detection on one CC indicates that the CC is non-idle, there is a need for entering the delay period CCA on the corresponding unlicensed carrier. This is repeated until the N value is 0, then the station acquires the right to use the corresponding unlicensed carrier.

In the above embodiment, in the case of no conflict, the processing rules of the initial CCA, the delay period CCA and the eCCA in the embodiments may be exchanged between different embodiments.

An embodiment of the present disclosure further provides a computer-readable storage medium storing a computer executable instruction that when being executed, implements the above described method for performing listen before talk on multiple unlicensed carriers according to the embodiment shown in FIG. 1.

An embodiment of the present disclosure further provides a computer-readable storage medium storing a computer executable instruction which, when being executed, implements the above described method for performing listen before talk on multiple unlicensed carriers according to the embodiment shown in FIG. 3.

A person ordinarily skilled in the art may understand that all or part of steps in the foregoing methods may be implemented by a program instructing relevant hardware (for example, a processor) to complete, and the program may be stored in a computer-readable storage medium, such as a read-only memory, a magnetic disk, or an optical disc and the like. Alternatively, all or part of the steps of the above embodiments may also be implemented by using one or more integrated circuits. Correspondingly, each module/unit in the above embodiments can be implemented in a form of hardware, for example, its corresponding functions are implemented by an integrated circuit, or can be implemented in a form of a software function module, for example, implemented by executing the program/instruction stored in the memory by the processor. The embodiments of the present disclosure are not limited to any particular form of a combination of hardware and software.

Although the embodiments disclosed in the present disclosure are as described above, the content is only an implementation adopted for facilitating understanding of technical solutions of the present disclosure and is not intended to limit the present disclosure. Any modification and variation in the form and details of implementation may be made by any person skilled in the art without departing from the core technical solutions disclosed in the present disclosure. However, the protection scope defined in this application may still be subject to the scope of the appended claims.

INDUSTRIAL APPLICABILITY

Embodiments of the present disclosure provide a method and an apparatus for performing listen before talk on multiple unlicensed carriers, through which, the right to use multiple unlicensed carriers may be quickly and simultaneously acquired when the multiple unlicensed carriers are needed for aggregation, so as to facilitate unlicensed carrier aggregation.

What is claimed is:

1. A method for performing Listen-Before-Talk (LBT) on multiple unlicensed carriers, comprising:
   performing, by a station, an individual LBT mechanism on each of unlicensed carriers to be aggregated to obtain a right to use the each of the unlicensed carriers;
   or
   configuring, by the station, a same LBT mechanism for the unlicensed carriers to be aggregated, performing a unified LBT mechanism on each of the unlicensed carriers to be aggregated to obtain the right to use each of the unlicensed carriers;
   or
   grouping, by the station, the unlicensed carriers to be aggregated, performing a corresponding LBT mechanism on each group of unlicensed carriers to obtain a right to use the each group of unlicensed carriers;
   or
   selecting, by the station, a plurality of unlicensed carriers for performing the LBT, wherein a number of plurality of unlicensed carriers is greater than a planned number of unlicensed carriers; and in response to determining that the unlicensed carriers of the planned number among the plurality of unlicensed carriers are obtained by performing of the LBT, stopping performing the LBT mechanism on the remaining unlicensed carriers;
   wherein performing, by a station, an individual LBT mechanism on each of unlicensed carriers to be aggregated to obtain a right to use the each of the unlicensed carriers comprises one of:
   in response to determining that the station performs the LBT mechanism on unlicensed carriers to be preempted and planned to be aggregated, using, by the station, a same random number N in random back-off of the unlicensed carriers to be aggregated preempted;
   in response to determining that extended Clear Channel Assessment (eCCA) detections of a plurality of unlicensed carriers simultaneously indicate idle, decrementing a value of N; and in response to determining that the value of N is 0, the plurality of unlicensed carriers are preempted by the station simultaneously;
   wherein the same random back-off value N is determined as: the station generates the N value according to a size of a contention back-off window of one of the unlicensed carriers wherein the one of the unlicensed carriers has the largest or smallest contention back-off window among all the unlicensed carriers;
   or
   determining, by the station, the unlicensed carriers to be preempted and planned to be aggregated, and performing LBT on the plurality of unlicensed carriers separately, and generating an independent random value N for each of the plurality of unlicensed carriers; in response to determining that the station successfully contends for one unlicensed carrier of the plurality of unlicensed carriers, the station including a priority in the preemption of an unlicensed carrier at a frequency point within a first preset range around the one unlicensed carrier for which the station successfully contended until the plurality of unlicensed carriers are preempted by the station;
   or
   in response to determining that the station already includes a right to use an unlicensed carrier and the station aggregates unlicensed carriers at a frequency point within a second preset range around the unlicensed carrier, the station including a priority in the preemption for aggregating the unlicensed carriers at the frequency point within the second preset range, until the plurality of unlicensed carriers are preempted by the station.

2. The method according to claim 1, further comprising: transmitting data on the unlicensed carriers, whose rights of use are obtained, in a carrier aggregation (CA) manner.

3. A method for performing Listen-Before-Talk (LBT) on multiple unlicensed carriers, comprising:
   in response to determining that a station aggregates unlicensed carriers, performing, by the station, a clear channel assessment (CCA) detection with a given duration on each of the unlicensed carriers;
   in response to determining that a result of the CCA detection on the each of the unlicensed carriers indicates that a channel is idle, generating, by the station, a random back-off value N for the each of the unlicensed carriers; and
   performing an extended clear channel assessment (eCCA) detection to decrement the value of N to obtain a right to use each of the unlicensed carriers,
   wherein the station uses a same random back-off value N in random back-off of all of the unlicensed carriers;
   wherein the same random back-off value N is determined as: the station generates the N value according to a size of a contention back-off window of one of the unlicensed carriers, wherein the one of the unlicensed carriers has the largest or smallest contention back-off window among all the unlicensed carriers.

4. The method according to claim 3, wherein the CCA detection with the given duration is an initial CCA detection;
   before the eCCA detection, and after the CCA detection with the given duration, the method further comprises: performing, by the station, a CCA detection with a duration of a delay period; and performing the eCCA detection in response to determining that a result of the CCA detection with the duration of the delay period indicates that the channel is idle.

5. The method according to claim 3, wherein a decrement rule of the N value comprises: in response to determining that eCCA detections on the unlicensed carriers indicate idle simultaneously, the N value is decremented.

6. The method according to claim 3, in response to determining that performing the CCA with the given duration on each of the unlicensed carriers, the station independently generates a same contention back-off window for each of the unlicensed carriers, or the station negotiates with other stations to generate a same contention back-off window for each of the unlicensed carriers.

7. The method according to claim 3, wherein in response to determining that performing the CCA with the given duration on each of the unlicensed carriers, the station independently generates a same random back-off value N for each of the unlicensed carriers, or the station negotiates with other stations to generate a same random back-off value N for each of the unlicensed carriers.

8. An apparatus for performing LBT on multiple unlicensed carriers, comprising:
   a first detector configured to, in response to determining that a station aggregates unlicensed carriers, perform a clear channel assessment (CCA) detection with a given duration on each of the unlicensed carriers;
   a processor configured to, in response to determining that a result of the CCA detection on the each of the unlicensed carriers indicates that a channel is idle, generate a random back-off value N for the each of the unlicensed carriers; and
   a second detector configured to perform an extended clear channel assessment (eCCA) detection to decrement the value of N to obtain a right to use each of the unlicensed carriers,
   wherein the station uses a same random back-off value N in random back-off of all of the unlicensed carriers;
   wherein the processor is configured to determine the same random back-off value N as: generate the N value according to a size of a contention back-off window of one of the unlicensed carriers, wherein the one of the unlicensed carriers has the largest or smallest contention back-off window among all the unlicensed carriers.

9. The apparatus according to claim 8, wherein the CCA detection with the given duration is an initial CCA detection;
   the apparatus further comprises a third detector configured to, before the eCCA detection and after the CCA detection with the given duration, perform a CCA detection with a duration of a delay period; and
   the second detector is configured to perform the eCCA detection in response to determining that a result of the CCA detection with the duration of the delay period indicates that the channel is idle.

10. The apparatus according to claim 8, wherein the first detector is configured to, in response to determining that performing the CCA with the given duration on each of the unlicensed carriers, independently generate the same random back-off value N for each of the unlicensed carriers, or negotiate with other stations to generate the same random back-off value N for each of the unlicensed carriers.

* * * * *

UNITED STATES PATENT AND TRADEMARK OFFICE
CERTIFICATE OF CORRECTION

PATENT NO. : 10,616,923 B2
APPLICATION NO. : 15/751118
DATED : April 7, 2020
INVENTOR(S) : Wei Gou et al.

Page 1 of 1

It is certified that error appears in the above-identified patent and that said Letters Patent is hereby corrected as shown below:

In the Claims

In Column 29, Line 61, Claim 1, delete "carriers" and insert --carriers,--.

Signed and Sealed this
Twenty-ninth Day of September, 2020

Andrei Iancu
*Director of the United States Patent and Trademark Office*